United States Patent
Young et al.

(10) Patent No.: US 10,048,860 B2
(45) Date of Patent: Aug. 14, 2018

(54) METHOD AND APPARATUS FOR USER INTERFACE ADAPTATION

(75) Inventors: Hoi L. Young, Lake Villa, IL (US); Michael Bohan, Fox Lake, IL (US); Steven M. Herbst, Libertyville, IL (US); Conor P. O'Sullivan, Chicago, IL (US); Chad A. Phipps, Grayslake, IL (US); Elisa S. Vargas, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1641 days.

(21) Appl. No.: 11/278,898

(22) Filed: Apr. 6, 2006

(65) Prior Publication Data

US 2007/0236460 A1 Oct. 11, 2007

(51) Int. Cl.
*G06F 3/02* (2006.01)
*G09G 5/00* (2006.01)
*G06F 3/0488* (2013.01)

(52) U.S. Cl.
CPC ................ *G06F 3/04886* (2013.01)

(58) Field of Classification Search
USPC .................................................. 345/156, 169
See application file for complete search history.

(56) References Cited

U.S. PATENT DOCUMENTS

| H000716 H | 12/1989 | McDonald et al. | |
| H0000716 H * | 12/1989 | McDonald et al. | 345/173 |
| 6,456,952 B1 | 9/2002 | Nathan | |
| 6,491,630 B1 | 12/2002 | Saccardo et al. | |
| 6,538,636 B1 * | 3/2003 | Harrison | 345/156 |
| 7,068,256 B1 * | 6/2006 | Gettemy et al. | 345/156 |
| 7,218,313 B2 * | 5/2007 | Marcus et al. | 345/169 |
| 7,653,883 B2 | 1/2010 | Hotelling et al. | |
| 7,800,592 B2 | 9/2010 | Kerr et al. | |
| 8,098,233 B2 | 1/2012 | Hotelling et al. | |
| 8,103,263 B2 * | 1/2012 | Shim et al. | 455/418 |

(Continued)

FOREIGN PATENT DOCUMENTS

| CN | 101266516 A | 9/2008 |
| CN | 101916161 A | 12/2010 |

(Continued)

OTHER PUBLICATIONS

Hinckley et al., "Sensing Techniques for Mobile Interaction," UIST 2000 Proceedings of the 13th annual ACM symposium on User interface software and technology, 2000, 10 pp. (Applicant points out, in accordance with MPEP 609.04(a), that the year of publication, 2000, is sufficiently earlier than the effective U.S. filing date, Apr. 6, 2006, so that the particular month of publication is not in issue.).

(Continued)

*Primary Examiner* — Kwang-Su Yang
(74) *Attorney, Agent, or Firm* — Shumaker & Sieffert, P.A.

(57) ABSTRACT

A method (FIG. 1) and apparatus (205) for user interface adaptation determines (110) a handedness of a user who is operating the handheld device, and changes (115) physical aspects of at least one touch target of a user touch interface of the handheld device to adapt to the handedness of the user when the handedness of the user is different than a current handedness of user touch interface of the handheld device.

17 Claims, 4 Drawing Sheets

(56) References Cited

U.S. PATENT DOCUMENTS

| | | | |
|---|---|---|---|
| 8,390,481 B2 | 3/2013 | Pance et al. | |
| 8,504,934 B1 | 8/2013 | Yu et al. | |
| 8,850,349 B2 | 9/2014 | Zhang et al. | |
| 9,013,397 B2 | 4/2015 | Hiramoto | |
| 9,215,302 B2 | 12/2015 | Thorson et al. | |
| 9,367,085 B2 | 6/2016 | Alberth et al. | |
| 2002/0107055 A1* | 8/2002 | Yamazaki et al. | 455/575 |
| 2003/0234768 A1* | 12/2003 | Rekimoto et al. | 345/169 |
| 2004/0036680 A1 | 2/2004 | Davis et al. | |
| 2004/0046744 A1 | 3/2004 | Rafii et al. | |
| 2004/0178994 A1 | 9/2004 | Kairis, Jr. | |
| 2005/0154798 A1 | 7/2005 | Nurmi | |
| 2005/0159850 A1 | 7/2005 | Melman | |
| 2006/0026535 A1 | 2/2006 | Hotelling et al. | |
| 2006/0038774 A1 | 2/2006 | Mese et al. | |
| 2006/0161871 A1 | 7/2006 | Hotelling et al. | |
| 2006/0192724 A1 | 8/2006 | Kezys et al. | |
| 2006/0197750 A1* | 9/2006 | Kerr et al. | 345/173 |
| 2006/0197753 A1* | 9/2006 | Hotelling | 345/173 |
| 2007/0010211 A1* | 1/2007 | Mixon | 455/90.3 |
| 2007/0236460 A1 | 10/2007 | Young et al. | |
| 2007/0291831 A1 | 12/2007 | Lee | |
| 2009/0069045 A1 | 3/2009 | Cheng | |
| 2009/0143106 A1 | 6/2009 | Meitzler et al. | |
| 2009/0160792 A1 | 6/2009 | Morohoshi et al. | |
| 2009/0259969 A1 | 10/2009 | Pallakoff | |
| 2010/0013651 A1 | 1/2010 | Spalink | |
| 2010/0045705 A1* | 2/2010 | Vertegaal et al. | 345/661 |
| 2010/0097331 A1 | 4/2010 | Wu | |
| 2010/0103098 A1 | 4/2010 | Gear et al. | |
| 2010/0103106 A1 | 4/2010 | Chui | |
| 2010/0120466 A1 | 5/2010 | Li | |
| 2010/0123675 A1 | 5/2010 | Ippel | |
| 2010/0134423 A1 | 6/2010 | Brisebois et al. | |
| 2010/0153313 A1 | 6/2010 | Baldwin et al. | |
| 2010/0259561 A1 | 10/2010 | Forutanpour et al. | |
| 2010/0315266 A1 | 12/2010 | Gunawardana et al. | |
| 2010/0315348 A1 | 12/2010 | Jellicoe | |
| 2011/0065392 A1 | 3/2011 | Chung | |
| 2011/0074692 A1 | 3/2011 | Causey et al. | |
| 2011/0090151 A1 | 4/2011 | Huang et al. | |
| 2011/0141120 A1 | 6/2011 | Platzer et al. | |
| 2011/0197158 A1 | 8/2011 | Tseng et al. | |
| 2011/0234487 A1 | 9/2011 | Hiramoto | |
| 2011/0242138 A1 | 10/2011 | Tribble | |
| 2011/0267280 A1 | 11/2011 | De Mers et al. | |
| 2011/0314429 A1 | 12/2011 | Blumenberg | |
| 2012/0026110 A1 | 2/2012 | Yamano | |
| 2012/0062387 A1 | 3/2012 | Vik et al. | |
| 2012/0071203 A1 | 3/2012 | Wong et al. | |
| 2012/0075249 A1 | 3/2012 | Hoch | |
| 2012/0113007 A1 | 5/2012 | Koch et al. | |
| 2012/0117506 A1 | 5/2012 | Koch et al. | |
| 2012/0138441 A1 | 6/2012 | Kim et al. | |
| 2012/0144337 A1 | 6/2012 | Archer et al. | |
| 2012/0188174 A1 | 7/2012 | Migos et al. | |
| 2012/0206556 A1 | 8/2012 | Yu et al. | |
| 2012/0315954 A1 | 12/2012 | Ahn et al. | |
| 2013/0019191 A1 | 1/2013 | Arnold | |
| 2013/0021293 A1 | 1/2013 | Nakai | |
| 2013/0034066 A1 | 2/2013 | Kakishima | |
| 2013/0035139 A1 | 2/2013 | Sheynblat et al. | |
| 2013/0038564 A1 | 2/2013 | Ho | |
| 2013/0093680 A1 | 4/2013 | Ogita | |
| 2013/0196596 A1 | 8/2013 | Parekh et al. | |
| 2013/0237272 A1 | 9/2013 | Prasad | |
| 2013/0300668 A1 | 11/2013 | Churikov et al. | |
| 2013/0307801 A1 | 11/2013 | Nam | |
| 2013/0317921 A1 | 11/2013 | Havas | |
| 2014/0032165 A1 | 1/2014 | Sarrafzadeh et al. | |
| 2014/0068492 A1 | 3/2014 | Yu et al. | |
| 2014/0078094 A1 | 3/2014 | Yang | |
| 2014/0108936 A1 | 4/2014 | Khosropour et al. | |
| 2014/0184171 A1 | 7/2014 | Lee et al. | |
| 2014/0187204 A1 | 7/2014 | Hartman | |
| 2014/0189551 A1 | 7/2014 | Kim et al. | |
| 2014/0208128 A1 | 7/2014 | Gyorfi et al. | |
| 2015/0002350 A1 | 1/2015 | Vance | |
| 2015/0236758 A1 | 8/2015 | Choi | |

FOREIGN PATENT DOCUMENTS

| | | |
|---|---|---|
| CN | 102298479 A | 12/2011 |
| EP | 1457864 A1 | 9/2004 |
| EP | 2360560 A1 | 8/2011 |
| EP | 2175344 A3 | 2/2012 |
| EP | 2515593 A2 | 10/2012 |
| JP | 1153093 A | 2/1999 |
| JP | 2007179502 A | 7/2007 |
| WO | 2010071188 A1 | 6/2010 |

OTHER PUBLICATIONS

International Search Report and Written Opinion of International Application No. PCT/US2007/06546, dated Feb. 7, 2008, 7 pp.

International Preliminary Report on Patentability from International Application No. PCT/US2007/06546, dated Oct. 8, 2008, 4 pp.

"Stock XOOM Browser Quick Controls", Mar. 2011, retrieved from xoomforms.com, 6 pp.

Andol, "Hand gesture detection and recognition using openCV," retrieved from www.andol.info/hci/895.htm, Jan. 26, 2012, 8 pp.

Stevens, "EyeSight's hand-waving, gesture-based UI now available for Android (video)," AOL Inc., retrieved from http://www.engadget.com/2010/06/08/eyesights-hand-waving-gesture-based-ui-now-available-for-andro/, Januray 26, 2012, 4 pp.

Sy, "Designing IR gesture-sensing systems," online version of Electronics Design, Strategy, News, retrieved from http://www.edn.com/article/print/518437-Designing_IR_gesture_sensing_systems.php, Jun. 9, 2011, 4 pp.

Wikipedia, "Gesture recognition," retrieved from http://en.wikipedia.org/wiki/Gesture_recognition, Jan. 26, 2012, 7 pp.

Wimmer, et al., "HandSense—Discriminating Different Ways of Grasping and Holding a Tangible User Interface," TEI 2009, Feb. 16-18, 2009, 4 pp.

Angus, "LiquidKeyboardTM, Bringing touch-typing to touch screens and surfaces," University of Technology, Sidney, http://www.liquidkeyboard.org/, accessed on Jan. 27, 2012, 2 pp.

Ridden, "LiquidKeyboard said to make tablet touch-typing a might easier," Mobile Technology, http://www.gizmag.com/liquidkeyboard-said-to-ease-touch-typing-woes-on-tablets/17691, Jan. 26, 2011, 2 pp.

Wauters, "Developer of 'Social Keyboard' Android app SwiftKey raises $2.4 million," TechCrunch, http://eu.techcrunch.com/2011/12/07/developer-of-social-keyboard-andro, Dec. 7, 2011, 1 pp.

* cited by examiner

METHOD AND APPARATUS FOR USER INTERFACE ADAPTATION

FIELD OF THE INVENTION

The present invention relates generally to handheld electronic devices, and more particularly to those having a touch screen user interface.

BACKGROUND

Handheld electronic devices having touch screens are known. Some currently available devices have touch target areas that function similarly to button switches, and in some cases there are at least some target areas that are optimized for right hand operation. In other cases, some or all target areas are arranged to be approximately equally usable for use by either hand, in which the target areas are typically arranged symmetrically around an axis that would be considered to be a vertical axis in the plane of the touch screen. This tends to make the target areas equally, but sub-optimally, useful for operation by either hand.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate the embodiments and explain various principles and advantages, in accordance with the present invention.

Figure 1:
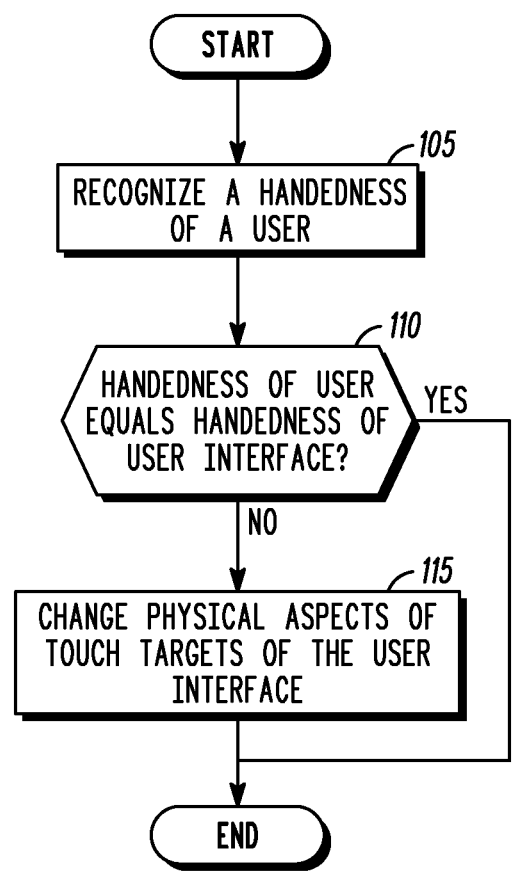
FIG. 1 is a flow chart that shows steps of a method used in a handheld device, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to handedness adaptation and optimization. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1, a flow chart shows steps of a method used in a handheld device, in accordance with some embodiments of the present invention. At step 105, a handedness of a user who is operating the handheld device is determined. At step 110, a determination is made as to whether the handedness of the user is the same as the handedness of a user touch interface (such as a touch screen) of the handheld device. At step 115, physical aspects of touch targets of the user touch interface of the handheld device are changed to adapt to the handedness of the user when the handedness of the user is different than the handedness of user interface of the handheld device. When the handedness of the user is the same as the handedness of user touch interface of the handheld device, step 115 need not be performed. In some embodiments, the control software may not implement the decision at step 110, and execute step 115 any time a determination is made of the handedness of the user, particularly in those embodiments in which a reimplementation of the handedness of the user is not detectable by or not objectionable to most users.

Figure 2:
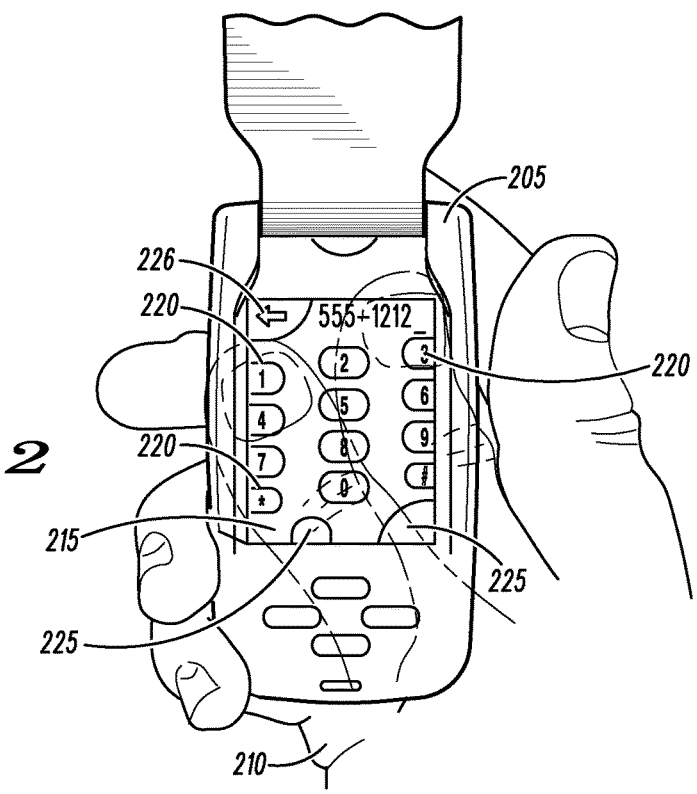
FIG. 2 is a drawing that illustrates a handheld device that is being held by the right hand of a user, in accordance with some embodiments of the present invention.

Referring to FIG. 2, a drawing illustrates a handheld device 205 that is being held by the right hand 210 of a user, in accordance with some embodiments of the present invention. The handheld device 205 in this example is a cellular telephone, but it will be appreciated that the present invention would provide benefits described herein for a large variety of handheld devices, including, but not limited to, television or hi-fidelity controllers, game controllers, projector controllers, calculators, and eBook readers. In the cellular telephone of the example shown in FIG. 2, there is a touch screen 215 that includes a variety of touch sensitive target areas, providing a user touch interface. There are a variety of well known technologies that can determine a location of a finger touch on a display screen to one of several target areas that are defined by outlines and graphics, such that each target area looks similar to a button. In the example shown in FIG. 2, there are 12 target areas 220 that constitute a phone pad arrangement, and other target areas 225, 226 that provide other functions. Physical aspects of the target areas 220, 225, 226 (the shape of each of the target areas 220, 225, 226 and the topographical relationship between the target areas 220, 225, 226) are arranged in a manner to make the operation of the cellular telephone easy for a person using the thumb of the right hand. In particular, each row of buttons is arranged at a slant or in a slight arc to match the natural movement of the thumb as it is extended across the touch screen. The physical aspects of the target areas shown in FIG. 2 may be only arrangement of many differing arrangements of physical aspects of the target areas that would provide the benefit of easy right handed operation. As may be evident from the illustration in FIG. 2, this arrangement of the target areas would likely be more difficult for a left handed person to use.

Figure 3:
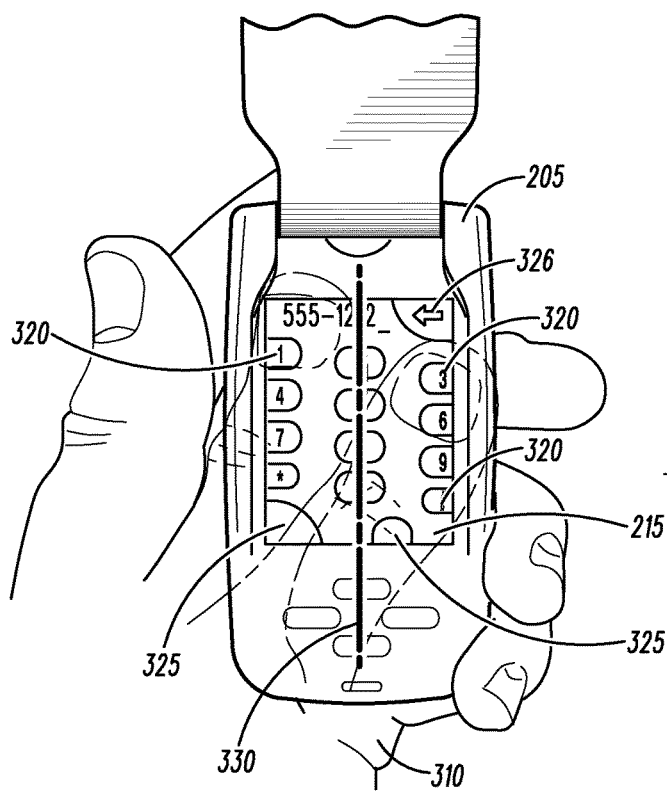
FIG. 3 is a drawing that illustrates the same handheld device as in FIG. 2, being held by the left hand of a user, in accordance with some embodiments of the present invention.

Referring to FIG. 3, a drawing illustrates the same handheld device 205 that is being held by the left hand 310 of a user, in accordance with some embodiments of the present invention. The physical aspects of the target areas in FIG. 3 have been altered, in a manner designed to make the layout easier for a left handed person. The change to the physical aspects of the target areas 320 of the phone pad portion of the touch screen 215 does not change the shapes of the target areas 320 in the example shown, but does change the locations of those target areas 320, resulting in slanted or slightly arced rows that are easily operated by a left hand thumb. (For the purpose of this document, a particular target area is identified by the function it performs, such as the "2 ABC" target). The change to the control function target areas 325, 326 may change both the shape of the target areas and their locations, in a manner to make them easier to use with the left hand. It will be observed that in this embodiment, the change to the physical aspects of the target areas 320, 325, 326 between right and left handed is a mirror image change to the physical aspects of the target areas, except that the characters and graphics are not reversed. It will be noted that in this instance, since the target areas of the phone pad portion of the touch screen are symmetrical left to right, a mirror image change to their outlines is not observable. The change to the physical aspects of the target areas 325, 326 in this embodiment may be generally described as mirror image changes, or could alternatively be described as changes to the outlines and locations of the target areas. It will be appreciated that the change of the shape aspect of a target area may be described using descriptors that include, but are not limited to, change in location, outline, size, orientation, and identification. A change in outline is meant to refer to any change that results in a new outline that is not geometrically similar to the original outline, and may include changes only to orientation of the target area (i.e., rotational changes). Thus, it can be said that the outline, and therefore, the shape of target area 326 is changed between the right handed configuration of FIG. 2 and the left handed configuration of FIG. 3. (Alternatively, the change can be described as a mirror image change—even though the graphics have not changed.) A mirror image change, in the context of this document, refers to a change to the entire set of target areas by being reflected about a "vertical" axis 330 that is in the plane of the touch screen 215 and that demarks equal halves of the touch screen, typically excluding reversal of graphics in the target areas.

Figure 4:
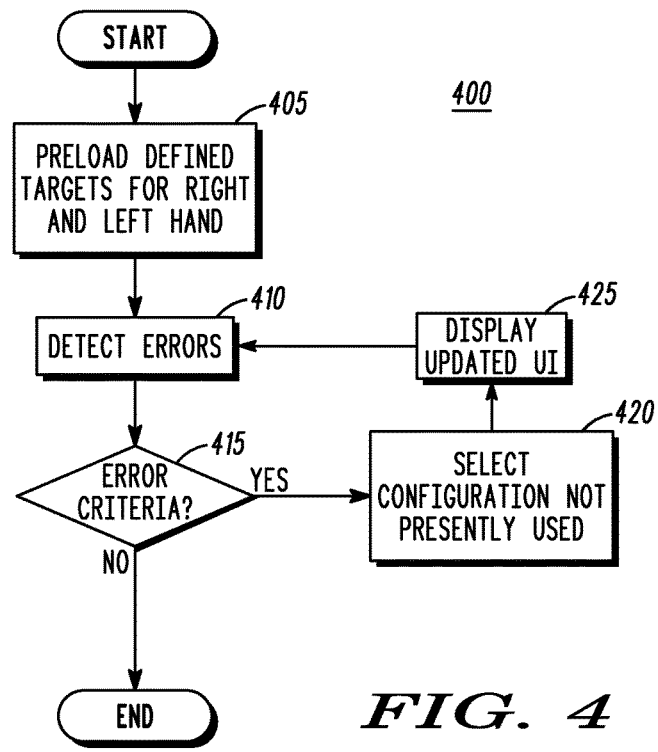
FIGS. 4 and 5 are flow charts that show some steps of methods used in a handheld device for adapting a user interface of the device to a handedness of the user, in accordance with some embodiments of the present invention.

Referring to FIG. 4, a flow chart 400 shows some steps of a method used in a handheld device for adapting a user interface of the device to a handedness of the user, in accordance with some embodiments of the present invention. At step 405, target area configurations that have been defined for each of right- and left-handedness are stored in the handheld device or a memory that is installed in the handheld device. Alternatively, the configurations could be stored elsewhere, such as in a system server. At step 410, entry errors are measured, and at step 415, when the errors meet some criteria, the configuration of the target areas' physical aspects that is not presently being used is selected at step 420, and implemented at step 425. Errors may then be detecting again at step 410, with the error measurement tailored to the newly selected handedness of the handheld device. When the error measurement made at step 410 does not meet the criteria at step 415, a determination is made that the configuration that is being used is correct and the process is terminated, at least temporally. The method 400 may be invoked only in response to certain conditions that have been identified as being likely to occur when the handheld device is being operated by a different user than has been operating it. For example, after the device is activated (such as opening a cover or touching a first target area after the device "goes to sleep" due to inactivity. Alternatively, the error measurements could be run continuously or at some defined intervals while the handheld device is active. The error measurements may include one or more of a variety of measurement techniques. For example, when there is an "off-hook" target area on one side of a phone device and an "on-hook" target area on the other side, counting "on-hook" activations when there is no call in process gives some indication of wrong-handedness. Another indication may be acquired by designing invisible target areas between identified target areas and using (unintentional) activations of the invisible target areas as some indication of a use of the device by the wrong hand.

Figure 5:
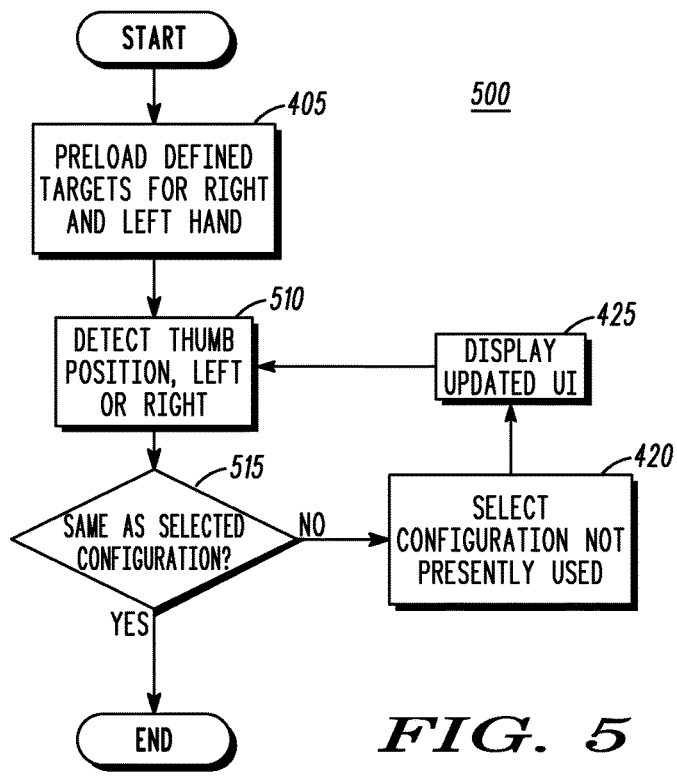

Referring to FIG. 5, a flow chart 500 shows some steps of a method used in a handheld device for adapting a user interface of the device to a handedness of the user, in accordance with some embodiments of the present invention. In this method, steps 405, 420, and 425 are the same as those in FIG. 4. At step 510, a thumb position of the hand holding the handheld device is detected. This may be done by a variety of techniques that involve target areas that may be uniquely provided for this purpose, such as along the right and left edges of the touch screen. These may be, as in the example above, invisible targets. Alternatively, these may be separate sensors on the sides of the handheld device (i.e., not in the touch screen). In yet another alternative, one of the standard target areas for the touch screen may be used, by timing a sensing of a touch for a long duration that indicates the thumb is resting on the target area. By any of these techniques, when an alignment with a target or sensor area is detected, a thumb position is determined at step 510, and then a determination is made at step 515 as to whether the thumb position matches the configuration being presented. When they are different, then steps 420 and 425 are used to change the configuration. Otherwise, no changes are made and the method ends.

There are variations to method 500, such as presenting no configuration (i.e., the touch screen is off) or a neutral configuration (i.e., equally usable by left and right handed users) to the user when the handheld device is initialized, or upon user command. In this instance, step 515 may be altered to be a selection and presentation of a configuration determined as indicted above with reference to FIG. 5, and steps 420 and 425 would be deleted. In other embodiments, step 510 could be a detection of a command entered by the user by selecting one or more target areas to command a change to the configuration of the handedness of the target areas from a first handedness, or from a neutral handedness, or from a presentation of no target areas or a very limited number of target areas (off), to a commanded configuration of the target areas that is for left or right handedness.

Figure 6:
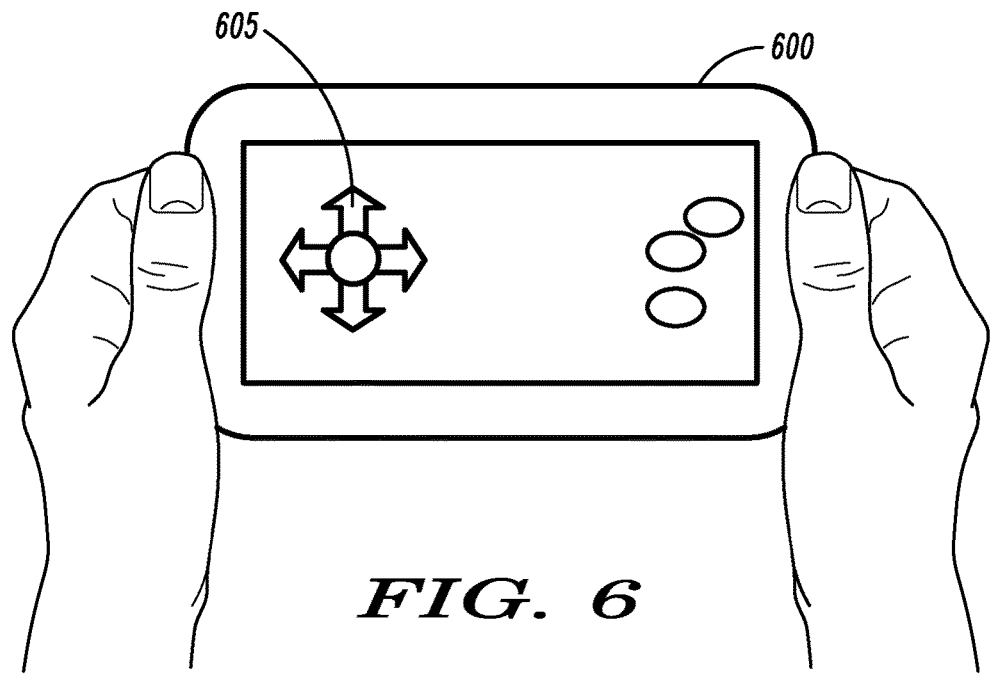
FIGS. 6 and 7 are drawings of a user using a handheld device, in accordance with some embodiments of the present invention.
Figure 7:
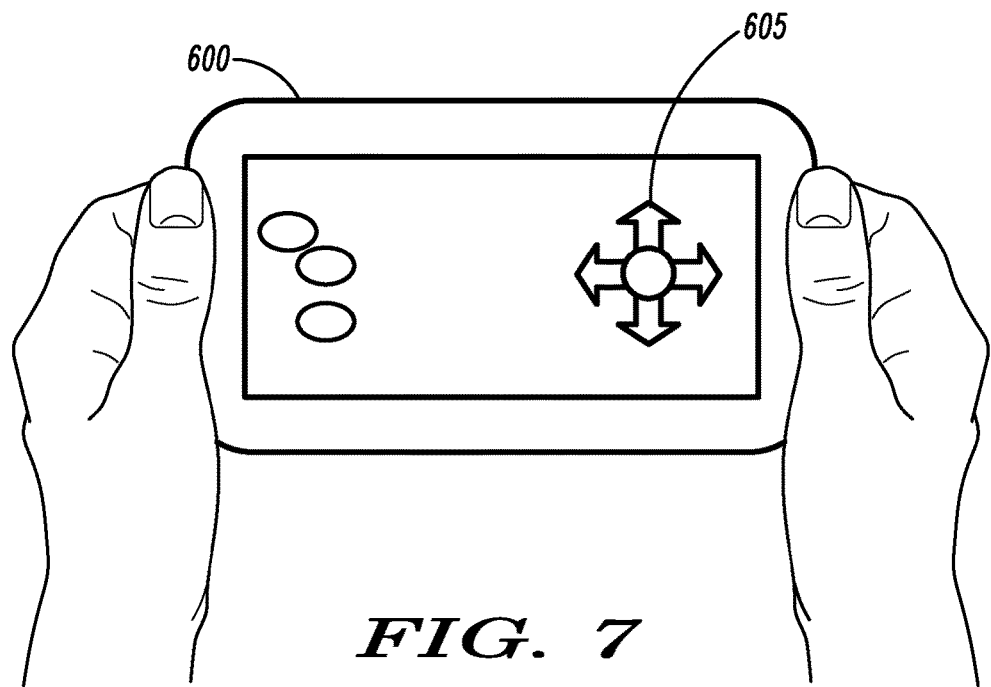

Referring to FIGS. 6 and 7, drawings of a user using a handheld device 600 are shown, in accordance with some embodiments of the present invention. These drawings illustrate a handheld device intended to be used with two hands, such as may be provided for a game controller. For this type of device, changing the physical aspects of one or more target areas may benefit users who are predominantly right handed or left handed, by, for example, locating a target area such as target area 605 for operation by the predominant hand. A determination of a best handedness may be accomplished by some of the techniques described above with reference to FIGS. 4 and 5, such as a user command or an error detection.

In each instance described above in which the handedness of the touch screen is changed in its configuration, there has been described a change of the physical aspects of at least a phone pad array of touch targets, but it will be appreciated that embodiments of the present invention in which the physical aspect of at least one target area is changed to adapt to a handedness of a user will provide some benefits of improved operation of the handheld device. For example, a neutral configuration of phone pad keys could be combined with one often used control key that is shifted from one side of the touch screen to the other side to adapt to the handedness of the user, providing some user benefits over known devices.

It will be appreciated that embodiments of the invention described herein may be comprised of one or more conventional processors and unique stored program instructions that control the one or more processors to implement, in conjunction with certain non-processor circuits, some, most, or all of the functions of the embodiments of the invention described herein. The non-processor circuits may include, but are not limited to, a radio receiver, a radio transmitter, signal drivers, clock circuits, power source circuits, and user input devices. As such, these functions may be interpreted as steps of a method to perform adaptation of a touch user interface. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for these functions have been described herein. In those situations for which functions of the embodiments of the invention can be implemented using a processor and stored program instructions, it will be appreciated that one means for implementing such functions is the media that stores the stored program instructions, be it magnetic storage or a signal conveying a file. Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method comprising:
receiving, by an electronic device, an indication of one or more touch inputs detected at a user touch interface;
determining, by the electronic device, that the one or more touch inputs correspond to one or more target area entry errors that are associated with an invisible area that is located substantially between a plurality of visible target areas output for display at the user touch interface;
determining, by the electronic device, and based on the one or more target area entry errors, a current handedness of a user who is operating the electronic device; and
responsive to determining the current handedness of the user, changing, by the electronic device, one or more physical aspects of at least one of the plurality of visible target areas output for display at the user touch interface to adapt to the current handedness of the user.

2. The method of claim 1, wherein changing the one or more physical aspects of the at least one of the plurality of visible target areas comprises:
shifting a location of at least a portion of the at least one of the plurality of visible target areas from one side of the user touch interface to another side of the user touch interface.

3. The method of claim 1, wherein changing the one or more physical aspects of the at least one of the plurality of visible target areas comprises:
changing a shape of the at least one of the plurality of visible target areas to a different shape.

4. The method of claim 1, wherein changing the one or more physical aspects of the at least one of the plurality of visible target areas comprises:
changing an orientation of the at least one of the plurality of visible target areas to a different orientation.

5. The method of claim 1, wherein changing the one or more physical aspects of the at least one of the plurality of visible target areas comprises:
providing a mirror image change to the at least one of the plurality of visible target areas, wherein the at least one of the plurality of visible target areas is mirror imaged about a vertical axis in a plane of the user touch interface.

6. The method of claim 5, wherein graphics in the at least one of the plurality of visible target areas are not mirror imaged.

7. The method of claim 1, wherein the current handedness of the user is selected from a group consisting of a left handedness, a right handedness, and a neutral handedness.

8. The method of claim 1, wherein the user touch interface comprises a touch screen.

9. The method of claim 1, wherein changing the one or more physical aspects of the at least one of the plurality of visible target areas is further responsive to determining that the current handedness of the user is different than a previous handedness of the user.

10. An electronic device comprising:
a user touch interface; and
at least one processor programmed to:
receive an indication of one or more touch inputs detected at the user touch interface;
determine that the one or more touch inputs correspond to one or more target area entry errors that are associated with an invisible area that is located substantially between a plurality of visible target areas output for display at the user touch interface;

determine, based on the one or more target area entry errors, a current handedness of a user who is operating the electronic device; and responsive to determining the current handedness of the user, change one or more physical aspects of at least one of the plurality of visible target areas output for display at the user touch interface to adapt to the current handedness of the user.

11. The electronic device of claim 10, wherein the at least one processor is programmed to change the one or more physical aspects of the at least one of the plurality of visible target areas at least by shifting a location of at least a portion of the at least one of the plurality of visible target areas from one side of the user touch interface to another side of the user touch interface.

12. The electronic device of claim 10, wherein the at least one processor is programmed to change the one or more physical aspects of the at least one of the plurality of visible target areas at least by changing a shape of the at least one of the plurality of visible target areas to a different shape.

13. The electronic device of claim 10, wherein the at least one processor is programmed to change the one or more physical aspects of the at least one of the plurality of visible target areas at least by changing an orientation of the at least one of the plurality of visible target areas to a different orientation.

14. The electronic device of claim 10, wherein the at least one processor is programmed to change the one or more physical aspects of the at least one of the plurality of visible target areas at least by providing a mirror image change to the at least one of the plurality of visible target areas, wherein the at least one of the plurality of visible target areas is mirror imaged about a vertical axis in a plane of the user touch interface.

15. The electronic device of claim 14, wherein graphics in the at least one of the plurality of visible target areas are not mirror imaged.

16. The electronic device of claim 10, wherein the current handedness of the user is selected from a group consisting of a left handedness, a right handedness, and a neutral handedness.

17. The electronic device of claim 10, wherein the at least one processor is programmed to change the one or more physical aspects of the at least one of the plurality of visible target areas further in response to determining that the current handedness of the user is different than a previous handedness of the user.

* * * * *